United States Patent
Schwankhaus et al.

(10) Patent No.: US 8,859,117 B2
(45) Date of Patent: Oct. 14, 2014

(54) LIGHT-PERMEABLE HEAT PROTECTION ELEMENT WITH ALUMINATE-MODIFIED OR BORATE-MODIFIED SILICON DIOXIDE

(76) Inventors: Norbert Schwankhaus, Baesweiler (DE); Udo Gelderie, Wurselen (DE); Dietrich Pantke, Ratingen (DE); Lothar Puppe, Burscheid (DE); Hartmut Melzer, Monheim (DE); Peter-Nikolaus Schmitz, Langenfeld (DE)

( * ) Notice: Subject to any disclaimer, the term of this patent is extended or adjusted under 35 U.S.C. 154(b) by 1071 days.

(21) Appl. No.: 12/921,692
(22) PCT Filed: Feb. 26, 2009
(86) PCT No.: PCT/CH2009/000080
§ 371 (c)(1), (2), (4) Date: Sep. 9, 2010
(87) PCT Pub. No.: WO2009/111897
PCT Pub. Date: Sep. 17, 2009

(65) Prior Publication Data
US 2011/0020654 A1    Jan. 27, 2011

(30) Foreign Application Priority Data
Mar. 10, 2008 (CH) .......... 354/08

(51) Int. Cl.
B32B 15/04 (2006.01)
B32B 17/06 (2006.01)
C04B 28/26 (2006.01)
B32B 17/10 (2006.01)
C09D 1/02 (2006.01)
C04B 111/28 (2006.01)
C04B 111/00 (2006.01)
C04B 111/80 (2006.01)

(52) U.S. Cl.
CPC .......... *C04B 28/26* (2013.01); *C04B 2111/28* (2013.01); *C04B 2111/00612* (2013.01); *B32B 17/10311* (2013.01); *C04B 2111/805* (2013.01); *C09D 1/02* (2013.01)

USPC .......... 428/701; 428/426; 428/428; 428/688; 428/689; 428/697; 428/699; 428/702

(58) Field of Classification Search
USPC .......... 428/426, 428, 688, 689, 701, 702, 697, 428/699
See application file for complete search history.

(56) References Cited

U.S. PATENT DOCUMENTS

| | | | | |
|---|---|---|---|---|
| 3,492,137 A * | 1/1970 | Iler | .............. | 106/636 |
| 3,721,574 A * | 3/1973 | Schneider et al. | .......... | 106/623 |
| 3,878,034 A | 4/1975 | Bever et al. | | |
| 4,190,698 A * | 2/1980 | De Boel et al. | .......... | 428/334 |
| 5,565,273 A * | 10/1996 | Egli et al. | .......... | 428/426 |
| 8,057,905 B2 * | 11/2011 | Goelff | .......... | 428/428 |
| 2003/0118861 A1 | 6/2003 | Heimann et al. | | |
| 2004/0037964 A1 * | 2/2004 | Davies et al. | .......... | 427/397.8 |
| 2005/0031790 A1 * | 2/2005 | Jackson et al. | .......... | 427/372.2 |

FOREIGN PATENT DOCUMENTS

| WO | 94/04355 | | 3/1994 |
|---|---|---|---|
| WO | 02/100636 | | 12/2002 |
| WO | 03/022940 | | 3/2003 |
| WO | WO2007060203 | * | 5/2007 |
| WO | 2007/118887 | | 10/2007 |

OTHER PUBLICATIONS

Dictionary.com (http://dictionary.reference.com/browse/silicic+acid), obtained 2013.*
aacash (http://www.aacash.com/chromat.htm), obtained 2013.*

* cited by examiner

Primary Examiner — David Sample
Assistant Examiner — Lauren Colgan
(74) Attorney, Agent, or Firm — Rankin, Hill & Clark LLP

(57) ABSTRACT

A light-permeable heat-protection element including at least one support element and at least one protective coating containing a reaction product which includes an aqueous alkali silicate solution and aluminate-modified or borate-modified silicon dioxide.

9 Claims, No Drawings

LIGHT-PERMEABLE HEAT PROTECTION ELEMENT WITH ALUMINATE-MODIFIED OR BORATE-MODIFIED SILICON DIOXIDE

BACKGROUND OF THE INVENTION

1. Field of the Invention

The invention relates to a transparent heat protection element having at least one support element and at least one protective layer comprising a reaction product containing aqueous alkali metal silicate solution and aluminate- or borate-modified silicon dioxide and also a process for producing it.

2. Description of Related Art

DE-A 2 414 575 describes fire-shielding glass panes containing a fire-resistant layer comprising a polymer membrane which on at least one side has a layer containing a barrier-forming material. This material may be an aluminate or an alkali metal silicate. The purpose of this material is to make the layer(s) more opaque to infrared radiation on heating, since this material forms thermally insulating barriers.

U.S. Pat. No. 4,190,698 describes transparent fire protection panes containing at least one dried layer comprising hydrated alkali metal silicates and one or more auxiliaries such as urea, polyhydric alcohols, colloidal silica or sodium aluminate. When colloidal silica and sodium aluminate are used, a modulus of less than 4 is achieved. The purpose of the addition of the auxiliaries is to improve the resistance of the layer and thus the fire protection pane in the case of fire. A disadvantage in the production of these fire protection panes is that evaporation of water from the original formulation is necessary, which is complicated from a production engineering point of view. The dried fire protection layer is formed by casting onto an open surface and subsequent drying and cannot be formed in closed hollow spaces. It is also known that the addition of sodium aluminate to the protective layer leads to precipitates and thus, as a further disadvantage, to the protective layer rapidly becoming cloudy.

WO-A 2004/014813 describes the production of heat protection elements based on a solution comprising water glass and an aluminate, with the aluminate having to be partially neutralized using organic acids such as citric acid before addition to the silicate solution. If partial neutralization of the aluminate is not carried out, a stable solution of water glass and aluminate is not obtained. A disadvantage in the production of these heat protection elements is that evaporation of water from the original formulation for the heat protection elements is necessary, which is complicated in terms of production engineering.

WO-A 94/04355 describes the production of a transparent heat protection element having at least one support element and a protective layer composed of water-containing alkali metal silicate. Such transparent heat protection elements are employed, for example, for the production of fire protection glasses. A significant constituent of the heat protection elements is the protective layer of water-containing alkali metal silicate which is produced by reaction of an alkali metal silicate and a silica aqua sol in such a mixing ratio that the molar ratio of silicon dioxide to the total amount of alkali metal oxide, known as the modulus, is greater than 4:1. The silica sol component is in this case used as hardener for the alkali metal silicate. Curing by means of silica sols enables the evaporation of water from the original formulation of the layer, which is necessary in other known protective layers and is complicated in terms of production engineering, to be dispensed with.

However, a disadvantage of protective layers composed of water-containing alkali metal silicate and silica sol as hardener, as described in WO-A 94/04355, is their tendency to become cloudy during use. This applies particularly in the case of prolonged exposure to temperatures above 20° C., which can be prolonged during the summer months and can accelerate the clouding process.

Electron micrographs confirm that the clouding of the aqueous alkali metal silicate protective layer is caused by a crystallization process. The additions of oxides of the elements of main group III of the Periodic Table, in particular boron oxide or aluminum oxide, are known to promote crystallization processes in glasses and should accordingly be expected to accelerate the clouding of glasses.

There is therefore a need for transparent heat protection elements and also materials for use as protective layers in such heat protection elements, which have a high transparency and aging resistance. In addition, the starting composition for the protective layer should be flowable and be suitable for casting into hollow spaces and subsequently harden over an appropriate period of time to form the protective layer.

BRIEF SUMMARY OF THE INVENTION

It was therefore an object of the present invention to provide such heat protection elements and also materials for use as protective layers in these heat protection elements.

This object has surprisingly been achieved by the protective layer comprising a reaction product containing aqueous alkali metal silicate solution and aluminate- or borate-modified silicon dioxide, with this reaction product having a modulus of from 4 to 7. An addition of organic acids as described in WO-A 2004/014813 is not necessary here.

The present invention accordingly provides a transparent heat protection element having at least one support element and at least one protective layer comprising a reaction product containing aqueous alkali metal silicate solution and aluminate- or borate-modified silicon dioxide, characterized in that the reaction product has a modulus of from 4 to 7.

As aqueous alkali metal silicate solution, it is possible to use water glass, preferably potassium water glass.

The silicon dioxide which is suitable for the purposes of the invention can, for example, be introduced in the form of precipitated silicon dioxide, silica gel, pyrogenic silicon dioxide or silica sols into the protective layers or be produced therefrom. Preference is given to using pyrogenic silicon dioxide or silica sols, particularly preferably silica sols. The water-containing silicon dioxide is preferably produced from stable suspensions, sols or gels or colloidal or colloidally disperse solutions, for example silica sols, of such forms of silicon dioxide. Silica sols and their production are known to those skilled in the art. Silica sols are commercially available; mention may here be made by way of example of the products obtainable under the trade name Levasil® from H. C. Starck GmbH.

Silica sols are colloidal solutions of amorphous silicon dioxide in water, which are also referred to as silicon dioxide sols but usually as silica sols for short. In these, the silicon dioxide is present in the form of spherical particles which are hydroxylated on the surface. The particle diameter of the colloidal particles is generally from 1 to 200 nm, with the specific BET surface area (determined by the method of G. N. Sears, Analytical Chemistry Vol. 28, No. 12, 1981-1983, December 1956), which correlates with the particle size, being from 15 to 2000 m²/g. The surface of the $SiO_2$ particles has a charge which is compensated by an appropriate counterion, leading to stabilization of the colloidal solution.

Silica sols which are suitable for the purposes of the invention have a pH of from 7 to 11.5 and contain, for example, small amounts of $Na_2O$, $K_2O$, $Li_2O$, ammonia, organic nitrogen bases, tetraalkylammonium hydroxides or alkali metal aluminates or ammonium aluminates as alkalizing agent. The pH values quoted are, unless indicated otherwise, pH values determined at 25° C. The solids concentrations of suitable silica sols are preferably from 5 to 60% by weight of $SiO_2$.

For the purposes of the invention, aluminate-modified silicon dioxide, in particular aluminate-modified silica sol, can be prepared, for example, by addition of a suitable amount of aluminate ions, $Al(OH)_4^-$, to silicon dioxide with stirring. The solution of aluminate ions is appropriately a dilute sodium aluminate or potassium aluminate solution. The silicon dioxide particles appropriately have from about 0.05 to about 2, preferably from about 0.1 to about 2, Al atoms/$nm^2$ of surface area of the silicon dioxide particles. The aluminate-modified silicon dioxide particles comprise inserted or exchanged aluminate ions, producing aluminosilicate sites having a fixed negative surface charge. The aluminate-modified silicon dioxide particles retain their high negative surface charge up to a pH of 3, in contrast to conventional unmodified silicon dioxide. In the case of unmodified silicon dioxide, the negative surface charge decreases when the pH is reduced, normally to a pH of about 2, which represents the zero-charge point for unmodified silicon dioxide. Thus, the surface charge for unmodified silicon dioxide particles at a pH below about 8 is smaller than for aluminate-modified silicon dioxide. The pH of the aluminate-modified silicon dioxide can appropriately be set to a pH in the range from 3 to 11, preferably from about 4 to 10, preferably by means of an ion-exchange resin. The aluminate-modified silicon dioxide can then be concentrated so that it has a silicon dioxide content of from about 1 to 60% by weight. The process for preparing the aluminate-modified silicon dioxide is also described in "The Chemistry of Silica" by Ralph K. Iler, pp. 407-409, John Wiley & Sons, 1979 and in U.S. Pat. No. 5,368,833.

An analogous production process can be employed for borate-modified silicon dioxide, in particular borate-modified silica sol.

The production of aluminate- or borate-modified silica sols comprises carrying out essentially the production steps of dealkylation of water glass by means of ion exchange, setting and stabilization of the desired particle size (distribution) of the $SiO_2$ particles, setting of the desired $SiO_2$ concentration and aluminate- or borate-modification of the $SiO_2$ particles. In none of these steps do the $SiO_2$ particles leave the colloidally dissolved state. This explains the presence of the discrete primary particles.

The aluminate- or borate-modified silicon dioxide preferably has an aluminate or borate content of from 0.01 to 1.5% by weight, particularly preferably from 0.05 to 1.0% by weight, based on the total weight of $SiO_2$ in the unmodified silicon dioxide.

The term modulus is known. To a person skilled in the art, the modulus of a siliceous binder is the molar ratio, which can be determined by analysis, of silicon dioxide ($SiO_2$) and alkali metal oxide $M_2O$ (M=boron, lithium, sodium or potassium) in the solid of the binder.

The aluminate- or borate-modified silicon dioxide preferably has a modulus of from 4.2 to 6.5.

The reaction product can preferably additionally contain an agent for lowering the freezing point; the agent for lowering the freezing point can be a monofunctional and/or polyfunctional alcohol selected from the group consisting of glycerol, glycol, sugar, diethylene glycol and polyethylene glycol.

The heat protection element of the invention is preferably a fire protection composite glass.

In preferred embodiments of the present invention, the protective layer(s) is/are in each case located between at least two support elements. Sandwich structures having a protective layer between two support elements or else multiple sandwich structures having an alternating sequence of support elements and protective layers can be obtained in this way. Support elements are preferably present on the outside. Suitable support elements for the transparent heat protection elements of the invention are glass elements, in particular glass plates or glass panes, but also other materials having the desired optical properties, as long as they satisfy the technical and physical requirements, for example heat resistance. However, support elements made of glass are particularly preferred. It is also possible to use fully or partially, thermally or chemically prestressed glass as support material.

The transparent heat protection elements of the invention can, according to the invention, be produced using a reaction product containing aqueous alkali metal silicate solution and aluminate- or borate-modified silicon dioxide, with the reaction product having a modulus of from 4 to 7, by introducing this reaction product into a mold cavity between two support elements or applying it to a support element, subsequently hardening it to form a solid silicate layer while retaining the water content and setting the molar ratio of silicon dioxide to alkali metal oxides (modulus) in the hardened silicate to a ratio of from 4:1 to 7:1.

The process of the invention thus makes it possible to produce composite elements which comprise a plurality of support elements arranged with a spacing between them and subsequently fill the intermediate space between the support elements with the reaction product and, if appropriate, one or more further hardeners such as silica sol, inorganic or organic acids, esters, acid amides, glyoxals, alkylene carbonates, alkali metal carbonates and hydrogencarbonates, borates, phosphates or para-formaldehyde. As a result of the high water content, the composition flows very well and can be poured without difficulty even into the intermediate spaces of composite elements having a small distance between the support elements. Since the reaction product hardens to form a finished silicate layer without drying, i.e. without removal of water, a drying operation can be dispensed with, which considerably simplifies the production of such heat protection elements. The reaction or hardening time can be reduced in a known manner by heating. The pot life of the castable reaction product at room temperature is in any case sufficiently long to make a normal production procedure possible. In the production of the heat production elements, the castable reaction product can, as described, be introduced or poured into a mold cavity between at least two support elements. However, it is also possible to apply the castable reaction product to a support element and subsequently place a second support element on top of the still unhardened protective layer or adhesively bond the second support element onto the protective layer in a known manner after hardening of said protective layer. In the production of multiple sandwich structures by the variant of application of the castable reaction product to a support element, the latter process would have to be repeated a number of times. The variant of pouring into appropriate hollow spaces therefore offers advantages for such structures.

The reaction product is preferably degassed before processing. This ensures that no gas inclusions which could adversely affect the optical quality of the heat protection element of the invention are present in the hardened silicate layer. However, degassing can also be carried out only after filling of the hollow spaces. To increase the adhesion of the silicate layer to the support elements, an auxiliary in the form of anionic or nonionic surfactants can be added to the reaction product before processing and/or the surfaces of the support elements can be pretreated with such an agent. The surfaces of the support elements can preferably also be pretreated with a bonding agent, in particular an organofunctional silane and/or wax dispersions.

The protective layer of hardened silicate produced according to the invention has good intrinsic strength and displays good adhesion to the adjoining support elements, preferably in the form of glass plates or other transparent components. The reaction product used as a starting composition is flowable and readily castable. The hardened protective layer is of high optical quality and transparency and has good aging resistance. The particular properties of the protective layer in the form of the hardened silicate are achieved by the silicate layer having a content of silicon dioxide in the range from 30 to 55% by weight. The content of alkali metal oxide in the form of sodium oxide, potassium oxide or lithium oxide or a mixture thereof is not more than 16%. The hardened silicate layer contains up to 60% of water. As a result, heat protection elements of the invention having such a protective layer achieve a very high fire resistance value since a relatively large amount of water is available for the vaporization process. According to the invention, the use of aluminate- or borate-modified silicon dioxide leads to an improvement in the aging resistance of the protective layer.

In a transparent heat protection element, the protective layer or silicate layer is advantageously arranged between two glass plates and together with these forms a composite element. To achieve higher heat resistance values, heat protection elements in which the heat protection element comprises a plurality of silicate layers arranged in each case between two glass plates and the glass plates and the polysilicate layers form a composite element are constructed. In these arrangements according to the invention, the silicate layers are in direct contact with the adjoining glass plates which form the support elements.

The use of a reaction product containing aqueous alkali metal silicate solution and aluminate- or borate-modified silicon dioxide in protective layers of transparent heat protection elements has hitherto not been described in this form in the literature.

The present invention accordingly further provides such a use of a reaction product containing aqueous alkali metal silicate solution and aluminate- or borate-modified silicon dioxide in at least one protective layer of a heat protection element characterized in that the reaction product has a modulus of from 4 to 7.

The preferred ranges for the transparent heat protection element of the invention apply analogously here.

Such a use is surprising, in particular, because for the reason mentioned at the outset aluminate- or borate-modification of silica sols in such a use would be expected to lead to earlier crystallization and thus to clouding of the protective layer rather than delay such crystallization.

DETAILED DESCRIPTION OF THE INVENTION

The following examples serve merely to illustrate the invention by way of example and are not to be construed as a limitation.

EXAMPLES

Reaction products, hereinafter referred to as fire protection layer composition, are produced by reaction of potassium water glasses with aluminate- or borate-modified silica sols. Potassium water glasses having a specific modulus and solids content are commercially available, but can also be prepared as described below by reaction of silica sols with potassium hydroxide.

Example 1

Preparation of Potassium Water Glass Having a Modulus of 2.25 and a Solids Content of 55% by Weight 2460 g of commercial potassium hydroxide pellets having a KOH content of about 86.5% by weight were placed together with 429 g of deionized water in a 6 liter three-neck stirred flask provided with condenser and dropping funnel. The three-neck flask was located in a water bath. While cooling, 5127 g of Levasil® 50/50% (specific surface area: about 50 m$^2$/g; solids content: about 50.5% by weight; manufacturer: H. C. Starck GmbH) were added at such a rate that a temperature in the range from 60 to 80° C. was maintained.

After the addition of the silica sol, the mixture was stirred at 70° C. for another 3 hours.

After sedimentation of the precipitate formed as by-product of the reaction the solution was decanted off.

Example 2

Aluminate- or Borate-Modification of Silica Sols Having a Specific Surface Area of about 50 m$^2$/g and a Solids Content of about 50.5% by Weight The aluminate or borate content is reported in % by weight calculated as $Al_2O_3$ or $B_2O_3$ based on the solids content of the unmodified silica sol.

For example, sols containing a) 0.64 and b) 0.32% by weight of $Al_2O_3$ and c) 0.22% by weight of $B_2O_3$ were produced as follows:

1000 g of Levasil® 50/50% were placed in a three-neck flask provided with stirrer, heating mantle, dropping funnel and distillation bridge. a) 60 ml or b) 120 ml of a solution of 25 g of commercial sodium aluminate in 500 ml of water or c) 79 ml of a solution of 5 g of commercial sodium tetraborate and 6.6 g of 10% strength sodium hydroxide solution in 250 ml of water were slowly added dropwise.

After the addition was complete, the mixtures were heated and water was distilled off in such an amount (in ml) that the original solids content was regained.

The distillation bridge was then replaced by a reflux condenser and the mixture was refluxed for a total boiling time of 3 hours.

Insoluble material formed was allowed to settle for a period of 24 hours and separated off by subsequent decantation.

Example 3

Production of a Fire Protection Layer Composition Having a Modulus of 4.7 from Potassium Water Glass and an Aluminate-Modified Silica Sol Containing 0.32% by Weight of $Al_2O_3$ 170.4 g of a potassium water glass characterized as in example 1 together with 13.5 g of commercial ethylene glycol were placed in a 250 ml multineck stirred flask with gas outlets. The mixture was heated to 20° C. by means of a heatable water bath.

116 g of a silica sol produced as described in example 2a) and containing 0.32% by weight of $Al_2O_3$ and having a specific surface area of 50 m²/g and a solids content of 50.5% were added over a period of 30 minutes.

The reaction mixture was stirred at 20° C. for a further 1.5 hours. It was then heated to 40° C. over a period of 30 minutes and maintained at this temperature for 30 minutes.

The reaction mixture was cooled to 20° C. over a period of 15 minutes by replacement of water in the heating bath. The mixture was stirred for a further 60 minutes at this temperature. During the last 20 minutes, a water pump vacuum of about 110 mbar was applied via the gas outlet.

About 60 ml of this reaction mixture were transferred by means of a glass piston-type pipette into a 100 ml glass bottle which was closed by means of a crown seal.

The bottled sample was heated at 80° C. in a drying oven for about 20 hours.

The absence of a sediment was then visually confirmed as a criterion for complete reaction and a turbidity of 1.6 TU/F (turbidity units based on formazine) was measured by means of a suitable turbidity photometer (e.g. model LTP 5 from Lange).

The storage of the sample at 80° C. was then continued with regular measurement of the turbidity until 3.5 TU/F was reached after 63 days, i.e. turbidity could be observed visually.

Example 4

Production of a Fire Protection Layer Composition Having a Modulus of 4.7 from Potassium Water Glass and an Aluminate-Modified Silica Sol Containing 0.64% by Weight of $Al_2O_3$ A silica sol produced as described in example 2b) and containing 0.64% by weight of $Al_2O_3$ and having a specific surface area of 50 m²/g and a solids content of 50.5% was reacted by the reaction procedure described in example 3.

After heating for 20 hours as described in example 3, the sample had a turbidity of 4.5 TU/F. After the reaction was complete, the turbidity was reduced to 2.1 TU/F after 3 days.

After 83 days, a renewed increase in the turbidity to 3.5 TU/F was observed.

Example 5

Production of a Fire Protection Layer Composition Having a Modulus of 4.7 from Potassium Water Glass and a Borate-Modified Silica Sol Containing 0.22% of $B_2O_3$ A silica sol produced as described in example 2c) and containing 0.22% by weight of $B_2O_3$ and having a specific surface area of 50 m²/g and a solids content of 50.5% was reacted by the reaction procedure described in example 3.

After heating for 20 hours as described in example 3, the sample showed a sediment and had a turbidity of 2.2 TU/F.

The increase in turbidity to 3.5 TU/F was found after 25 days.

Comparative Example

Production of a Fire Protection Layer Composition from Potassium Water Glass and an Unmodified Silica Sol An unmodified silica sol having a specific surface area of 50 m²/g and a solids content of 50.5% was reacted by the reaction procedure described in example 3.

After heating for 20 hours as described in example 3, the sample showed a sediment and had a turbidity of 1.5 TU/F.

The increase in the turbidity to 3.5 TU/F was observed after 20 days.

The invention claimed is:

1. A transparent heat protection element comprising:
   at least two support elements; and
   at least one protective layer located between the at least two support elements;
   wherein the protective layer comprises a reaction product containing an aqueous alkali metal silicate solution and at least one of aluminate-modified silicon dioxide and borate-modified silicon dioxide, and
   wherein the reaction product has a modulus of from 4 to 7.

2. The transparent heat protection element as claimed in claim 1, wherein the silicon dioxide is selected from the group consisting of silica sol, precipitated silicon dioxide, silica gel and pyrogenic silicon dioxide.

3. The transparent heat protection element as claimed in claim 1, wherein the silicon dioxide is silica sol.

4. The transparent heat protection element as claimed in claim 1, wherein the silicon dioxide has an aluminate or borate content of from 0.01 to 2.0% by weight, based on a total weight of $SiO_2$ in the silicon dioxide in an unmodified state.

5. The transparent heat protection element as claimed in claim 4, wherein the silicon dioxide has an aluminate or borate content of from 0.01 to 1.5% by weight, based on the total weight of $SiO_2$ in the silicon dioxide in the unmodified state.

6. The transparent heat protection element as claimed in claim 1, wherein the aqueous alkali metal silicate solution is water glass.

7. The transparent heat protection element as claimed in claim 1, wherein the reaction product has a modulus of from 4.2 to 6.5.

8. The transparent heat protection element as claimed in claim 1, wherein the reaction product additionally contains an agent for lowering the freezing point.

9. The transparent heat protection element as claimed in claim 1, wherein the heat protection element is a fire protection composite glass.

* * * * *